United States Patent [19]

Hammerschlag

[11] 4,422,517

[45] Dec. 27, 1983

[54] BAG-POSITIONED HINGED SEALS FOR AIR CUSHION VEHICLES

[76] Inventor: Peter G. Hammerschlag, 220 - 111th Ave. SE., Bellevue, Wash. 98004

[21] Appl. No.: 793,845

[22] Filed: May 4, 1977

[51] Int. Cl.³ .......................... B60V 1/04; B60V 1/16
[52] U.S. Cl. ................................ 180/127; 114/67 A; 180/126
[58] Field of Search .............. 180/126, 116, 117, 118, 180/119, 120, 127, 128; 114/67 A; 104/23 FS

[56] References Cited

U.S. PATENT DOCUMENTS

| | | | |
|---|---|---|---|
| 1,819,216 | 8/1931 | Warner | 114/67 A |
| 3,146,752 | 9/1964 | Ford | 114/67 A |
| 3,191,705 | 6/1965 | Jones | 180/126 |
| 3,204,715 | 9/1965 | Maloof | 180/126 |
| 3,249,166 | 5/1966 | Cockerell | 180/128 |
| 3,400,779 | 9/1968 | Grace | 180/128 |
| 3,473,503 | 10/1969 | Gunther | 114/67 A |
| 3,532,180 | 10/1970 | Ford | 180/126 |
| 3,601,062 | 8/1971 | Bertin | 104/23 FS |

*Primary Examiner*—John A. Pekar

[57] ABSTRACT

Bow and stern seals for sidewall type air cushion vehicles for containing, together with the sidewalls, the air cushion under the vehicle. They consist of a substantial number of more or less equidistant rods (or "stays") connected by flexible membranes, these rods being designed to hinge around a more or less common axis at substantially the top of the air cushion, the rods extending beyond their hinge points and being positioned by two sets of opposing air bags, one set of air bags acting on the extensions of the rods above the hinge points and the other set on the sections of the rods just below the hinge points. The membranes are attached with a large amount of slack so that the rods can rotate a very substantial amount relative to each other. As the air bags will allow the rods only to rotate a limited amount relative to each other, the membranes will not get tight, and the membranes and rods will not be exposed to the accompanying shock loads leading to membrane tear and rod breakage. The bags react upon the ship structure, which has air chambers connected to the bags with openings that can be closed off partially or completely, to change the response characteristics of the air bags and thereby of the seal.

3 Claims, 12 Drawing Figures

BAG-POSITIONED HINGED SEALS FOR AIR CUSHION VEHICLES

BACKGROUND OF THE INVENTION

This invention concerns itself with the seals on air cushion vehicles and more particularly with the seals in the front and the rear of air cushion vehicles with rigid sidewalls. These air cushion vehicles are also known as "captured air bubble" (CAB) vehicles, and the rigid sidewalls are also referred to as "sidehulls". The function of the front and rear seals is of course to contain, together with the sidewalls, the air cushion under the vehicle.

The air cushion vehicle with rigid sidewalls is mostly used for over-water service with little or no amphibious capability. The reason for this is that the rigid sidewalls cannot conform to an uneven land-contour but are satisfactory for over-water travel, this because their slender shape allows them to submerge in water with only relatively little hydrodynamic drag when encountering waves.

The invention will be described as designed for an over-water sidewall type air cushion vehicle, but it must be clearly understood than its usage is not limited to this application and that it can be used also on other types of air cushion vehicles and devices as well as vehicles and devices that do not use air but other gaseous or fluid media to support at least part of their weight.

The most simple way to seal off an air cushion in the front and the rear is to use stiff hinged flaps as shown in FIG. 1 and FIG. 3 of U.S. Pat. No. 3,191,705 (Jones and Hardy). However, the cushion pressure will tend to push these flaps into an open position letting the cushion air escape. When the vehicle is moving, the hydrodynamic planing forces on the front seal will counteract this opening force, but to prevent the seal from being pushed open when the vehicle is stopped or moving very slowly, physical "stops" have to be provided limiting its forward position. U.S. Pat. No. 3,191,705 shows such stops in its FIG. 3, item 6, consisting of two blocks attached to the sidewalls stopping the seal at its ends. On the rear seal any hydrodynamic planing forces will act with the cushion pressure and therefore a counteracting force has to be created. In U.S. Pat. No. 3,191,705, FIG. 3, this is done by suspending a membrane, item 10, between the end of the seal and the ship structure, and blowing pressurised air in the cavity between the membrane, the seal flap and the ship structure. If the pressure in this cavity is kept above cushion pressure, it will keep the seal down.

A major problem with these stiff flap seals is that they do not conform to changes in waterheight across the ship (perpendicular to the ships lengthwise centerline). This will cause first of all substantial air leakage under the part of the seal where the waterlevel is lower. Second, when the vehicle moves over a wave with the ship direction not perpendicular to the wave crest, the seal flap will be pushed up at one corner and due to its stiffness, the force required to accelerate its entire mass will be exerted on this corner. These acceleration forces are very large when traveling at high speed over waves, and will subject the stiff flap structure to high torsional loads and stresses. Making the seal structure stronger will tend to be a self-defeating solution, as it will increase the seal's weight, which will increase again the acceleration forces developed. In practice these acceleration forces will destroy any stiff seal flap structure, unless so heavy that it cannot follow waves sufficiently and will create unacceptable high drag.

A solution to the above problem is to let the seal consist of a substantial number of approximately equidistant rods (or "stays") hinged from the ship structure like the flap, but connected by flexible membranes, as shown in FIG. 2 of U.S. Pat. No. 3,532,180 (Ford and Wilson). The "stays" consist here of spring steel strips 33 sewn or bonded within a rubberised fabric or similar material 35. As the seal is now compliant across the ship, it is however not possible anymore to have simple fixed stops at the ends of the seal as shown in the previously mentioned U.S. Pat. No. 3,191,705. Therefore U.S. Pat. No. 3,532,180 uses so-called "down-stop lines" (items 51 in its FIGS. 1, 2 and 3) that tie each individual stay to the ship structure above.

This seal design, though an improvement over the previously described stiff flap, has not been satisfactory either. The main problem is that the down-stop lines get slack when the waves push the seal up and then tighten up again after the wave has passed. The downward movement of the seal after passing a wave has to be fast (at high vehicle speed) to keep air leakage at a minimum, and when the down-stop lines get tight they induce large shockloads on the rods and the attachments of the membranes to the rods, causing both breakage and membrane tearing. In addition, this type of seal—essentially one large membrane with stiffening rods—is subject to flutter-type vibrations. That is, after passing over a wave and loosing contact with the water it will flap around like a flag in the wind, causing neighbouring rods to move in opposing directions till the membrane gets tight with a shock, causing tear failures of the membrane. This structural integrity deficiency was very well demonstrated on the U.S. Navy's 100A (100 ton) sidewall type air cushion test craft that was initially outfitted with a bow seal of this design. (Note: The "flutter" problem has been reduced to a certain extent in U.S. Pat. No. 3,532,180 by making the upper part of the seal, item 27 in their FIG. 3, a stiff plate, however by doing so the problems of the stiff plate as discussed before are reintroduced. The 100A bow seal did not have the upper part of the seal a stiff flap, but had stiffening rods all the way from the bottom to the top of the seal hinged to the ship structure and connected by a membrane.)

The object of this invention is to provide seals of the just discussed kind, that is with a substantial number of more or less equidistant hinged rods (or "stays") connected by flexible membranes, that have means to keep the seal in a nominal position, these means being such that:

(1) They do not induce the previously mentioned shock loads on rods and membranes.
(2) They allow the seals to follow waves upwards without excessive hydrodynamic drag and downwards without excessive air leakage from the cushion.
(3) They allow the pilot of the ship to change the nominal position of the seals continuously between a down position with the lower hemline of the seals approximately flush with the bottom of the side walls and a fully up position with the seals approximately horizontal, without adversely affecting the wave-following capabilities mentioned in point (2).
(4) They allow the pilot of the ship to change the reaction forces on the ship from the seals depending on sea state, speed and heading of the ship, to minimize pitch, roll and heave motions of the ship.

SUMMARY OF THE INVENTION

Briefly, the seal for air cushion vehicles of the present invention consists of a substantial number of more or less equidistant rods (or "stays") connected by flexible membranes, these rods being designed to hinge around a more or less common axis at substantially the top of the air cushion, the rods extending beyond their hinge points and being positioned by two sets of opposing air bags, one set of air bags acting on the extensions of the rods above the hinge points, and the other set on the sections of the rods just below the hinge points. The membranes are attached with a large amount of slack so that the rods can rotate a very substantial amount relative to each other. As the air bags will allow the rods only to rotate a limited amount relative to each other, the membranes will not get tight and the membranes and rods will not be exposed to the accompanying shock loads leading to membrane tear and rod breakage. The bags react upon the ship structure, which has air chambers connected to the bags with openings that can be closed off partially or completely, to change the response characteristics of the air bags and thereby of the seal. The seal is kept in its nominal position by a control system that controls the flow of air into and out of the two opposing sets of air bags positioning the seal. The control system is designed such that the pilot of the ship can vary the nominal position of the seal continously from fully down with the seal hemline flush with the bottom of the sidewalls to fully up, parallel with and aproximately in line with the bottom of the ship structure, the latter extreme position for off-cushion operation. The control system can incorporate features that reduce hydrodynamic drag when the seal is pushed up by waves, reduce air leakage when the seal is following a wave down and allow the pilot of the ship or an automatic control system to change the reaction forces of the seals on the ship structure such that ride quality is improved.

DETAILED DESCRIPTION

Figure 1:
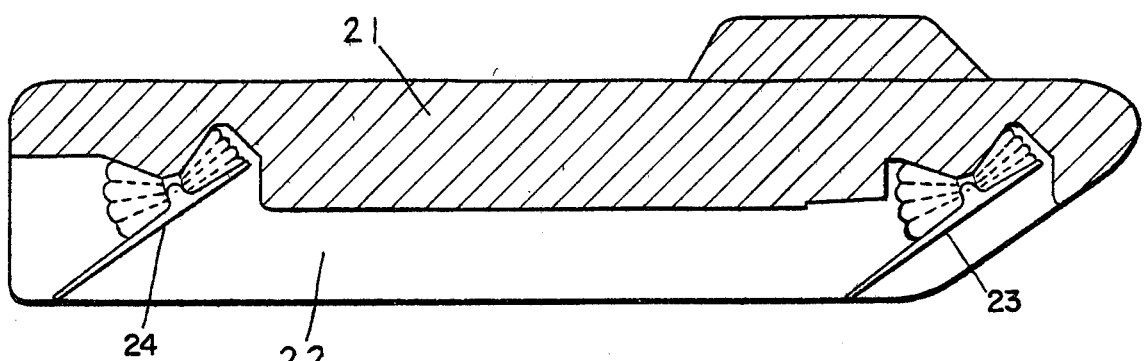
FIG. 1 is a longitudinal section through the center of an air cushion vehicle equipped with seals per this invention.
Figure 2:
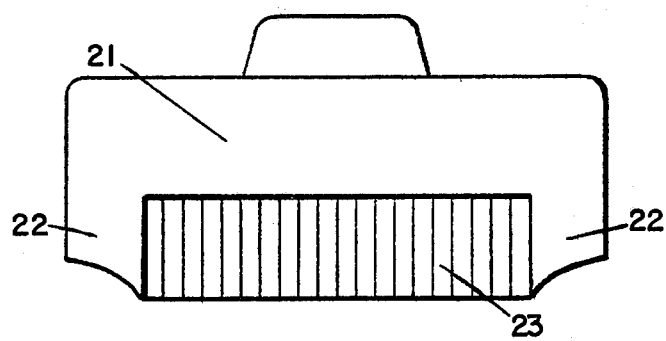
FIG. 2 is a front view and FIG. 3 a bottom view of the same vehicle.
Figure 3:
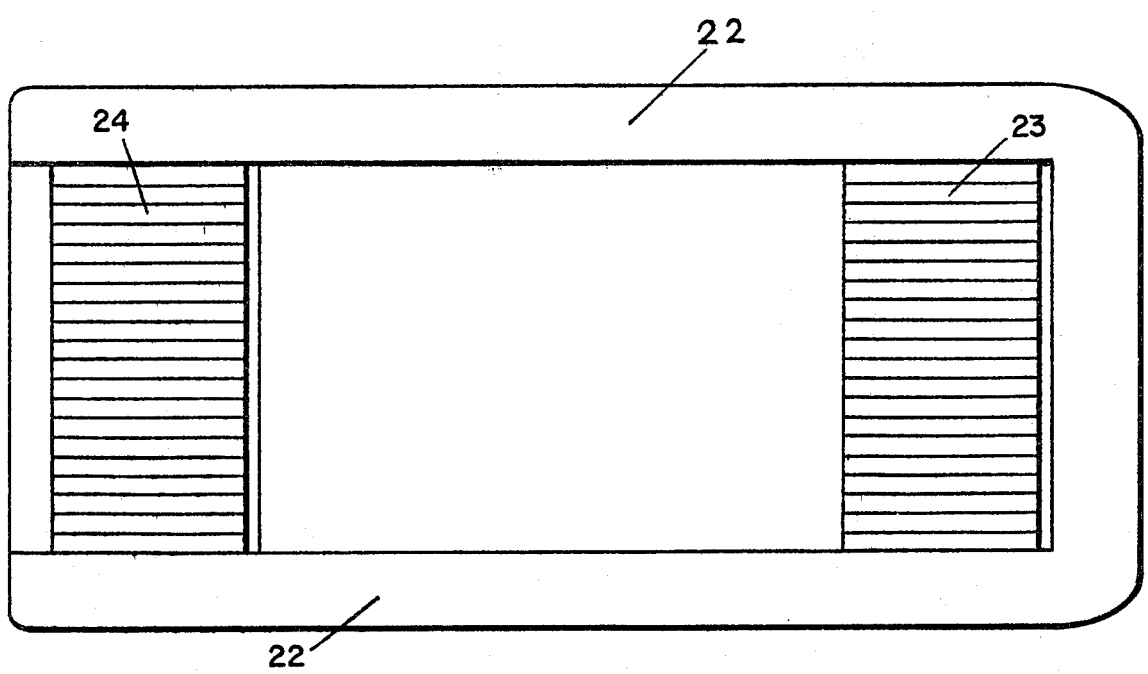

Referring to FIGS. 1, 2 and 3, an air cushion vehicle is shown with a body 21, sidewalls 22, a bag-positioned bow seal 23 and a bag-positioned stern seal 24, both per this invention.

Figure 4:
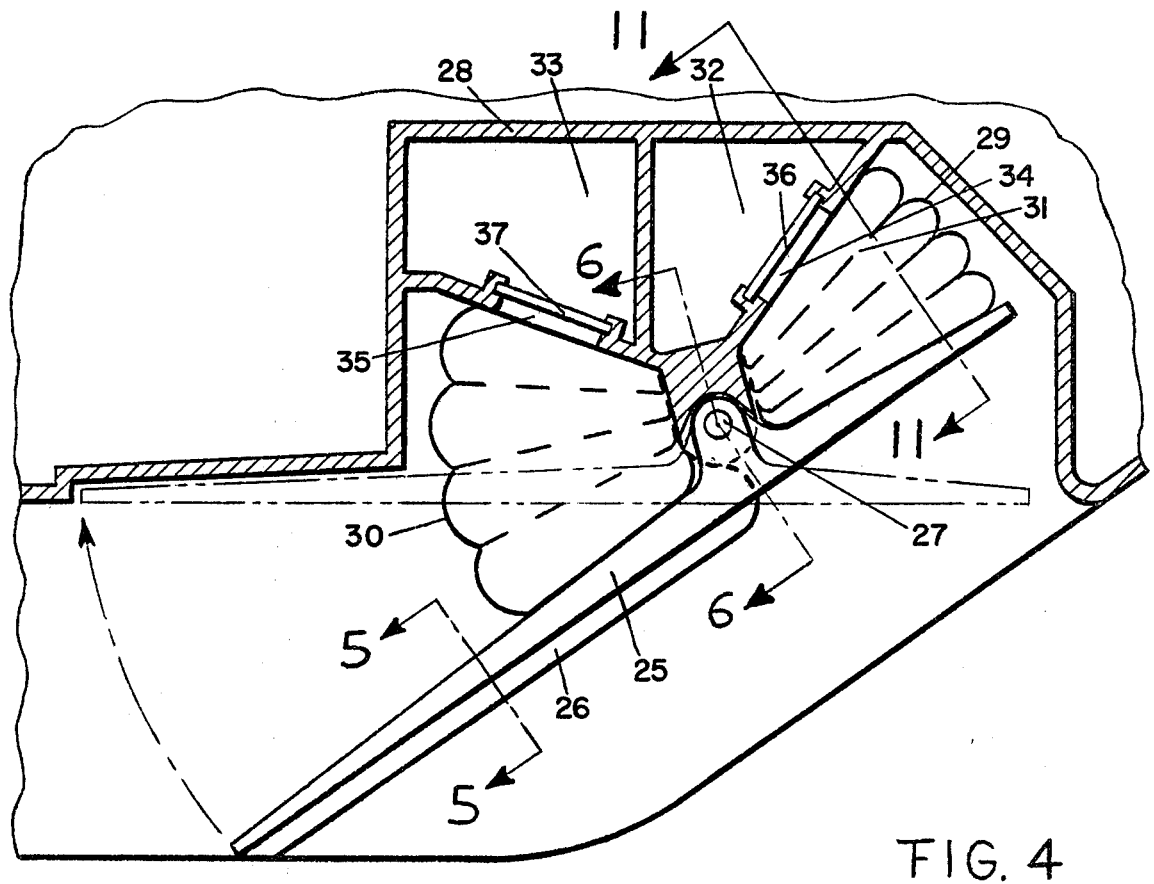
FIG. 4 is a section through the bow seal area of this vehicle as in FIG. 1, but enlarged and showing more detail.
Figure 5:
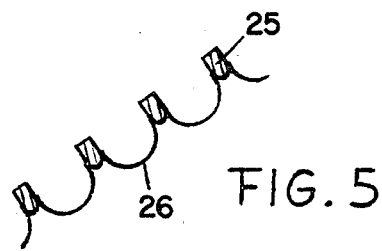
FIG. 5 is a section through four neighbouring stiffening rods of the bow seal and the membranes connecting them, taken along line 5—5 in FIG. 4.
Figure 6:
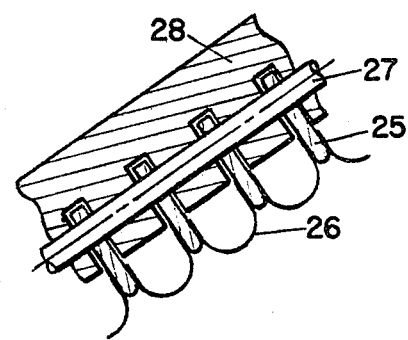
FIG. 6 is a section through the hinge points of four neighbouring stiffening rods of the bow seal, taken along line 6—6 in FIG. 4.

FIGS. 4, 5 and 6 show enlarged the bow seal with the hinged stiffening rods 25, the membranes 26, made out of a rubber coated fabric or a similar flexible material, the hinge pins 27 with which the stiffening rods 25 are attached to the ship structure 28, the upper air bags 29 and the lower air bags 30. The air bags are also made out of a rubber coated fabric or a similar flexible material and can be single lobe or multiple-lobed like the four-lobed bags shown in FIG. 4. If multiple-lobe air bags are used, a sufficient number of holes 31 are provided in the intermediate webs to allow free airflow from one lobe to another. In addition there are "upper" and "lower" air chambers 32 and 33 in the ship structure connected with the "upper" and "lower" air bags respectively, through openings 34 and 35 that can be closed off partially or completely by sliding or otherwise movable gates, valves, louvers or the like, 36 and 37.

FIG. 5 shows the large amount of slack provided in the membranes, causing them to bulge out under cushion pressure into a part circular shape and allowing neighbouring stiffening rods to rotate a very substantial amount relative to each other. However, the air bags will allow the rods only to rotate a limited amount relative to each other, because of the large restoring forces developed by the bags when one rod tries to rotate a substantial amount away from its neighbouring rods. This will be explained referring to FIG. 11a and 11b.

Figures 11A, 11B:
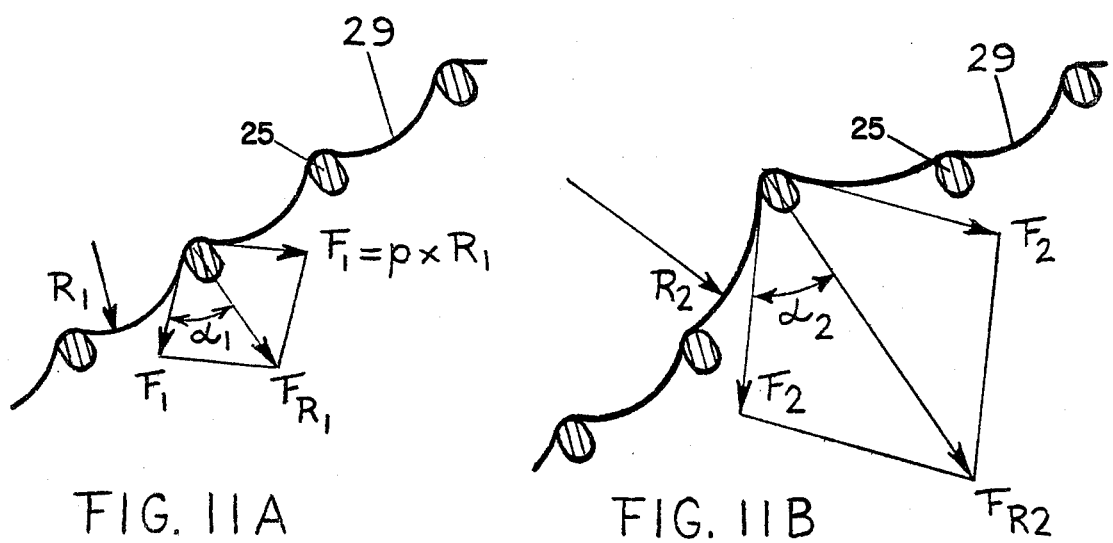
FIG. 11a and 11b are sections through five neighbouring stiffening rods and the wall of the air bag lying on top of them. The sections are taken along line 11—11 in FIG. 4 and shown on a larger scale than FIG. 4.

FIG. 11a shows five neighbouring stiffening rods and the wall of the air bag lying on top of it. The air pressure inside the bag will bulge out the wall of the bag between the stiffening rods with a radius $R_1$ as shown in FIG. 11a. The tension per unit of length $F_1$ in the membrane type material of the walls of the bags equals the air pressure p times the radius $R_1$. The total force per unit of length exerted by the air bag on the stiffening rod, $F_{R1}$, will be: $F_{R1} = 2 \times F_1 \times \cos \alpha_1 = 2 \times p \times R_1 \times \cos \alpha_1$ as graphically shown in FIG. 11a.

When a stiffening rod is rotated only a relatively small amount relative to its neighbouring rods, the distance between the places where the bag rests on the rods remains about the same, thus $R_1$ will remain about the same and though $\alpha$ will vary about linearly with the displacement of the rod relative to its neighbours, $F_{R1}$ will not change dramatically, which means that the seal will be compliant with regard to changes in waterheight across the seal.

However, when a stiffening rod is rotated a relatively large amount in relation to its neighbouring rods, the distance between the places where the bag rests on the rods increases significantly, and the radius of the air bag wall will increase substantially, thus increasing the tension in the air bag wall. This combined with the change in the angle $\alpha$ between the air bag walls and the rods generates a large restoring force as graphically illustrated in FIG. 11b, where the forces are shown that develop when a rod is moved a substantial amount upwards relative to its neighbouring rods. When it is moved a substantial amount downwards it will loose contact with the air bag, which means of course no more force from the air bag onto the rod. This will increase very substantially the effect of the restoring force from the air bag at the other side of the hinge point. Thus the air bags will allow the rods to rotate only a limited amount relative to each other and thereby prevent the membranes between the rods from getting tight and eliminate the shockloads that will lead to membrane tear and rod breakage.

The large amount of slack in the membranes between the rods will also allow small waves which pass under the bow seal to push up the membrane, thus reducing the hydrodynamic drag of the seal as it will be too heavy to follow these small high-frequency waves by hinging action.

Figure 8:
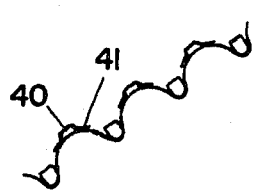
FIG. 8 is a section through four neighbouring stiffening rods of the stern seal and the membranes connecting them, taken along line 8—8 in FIG. 7.
Figure 7:
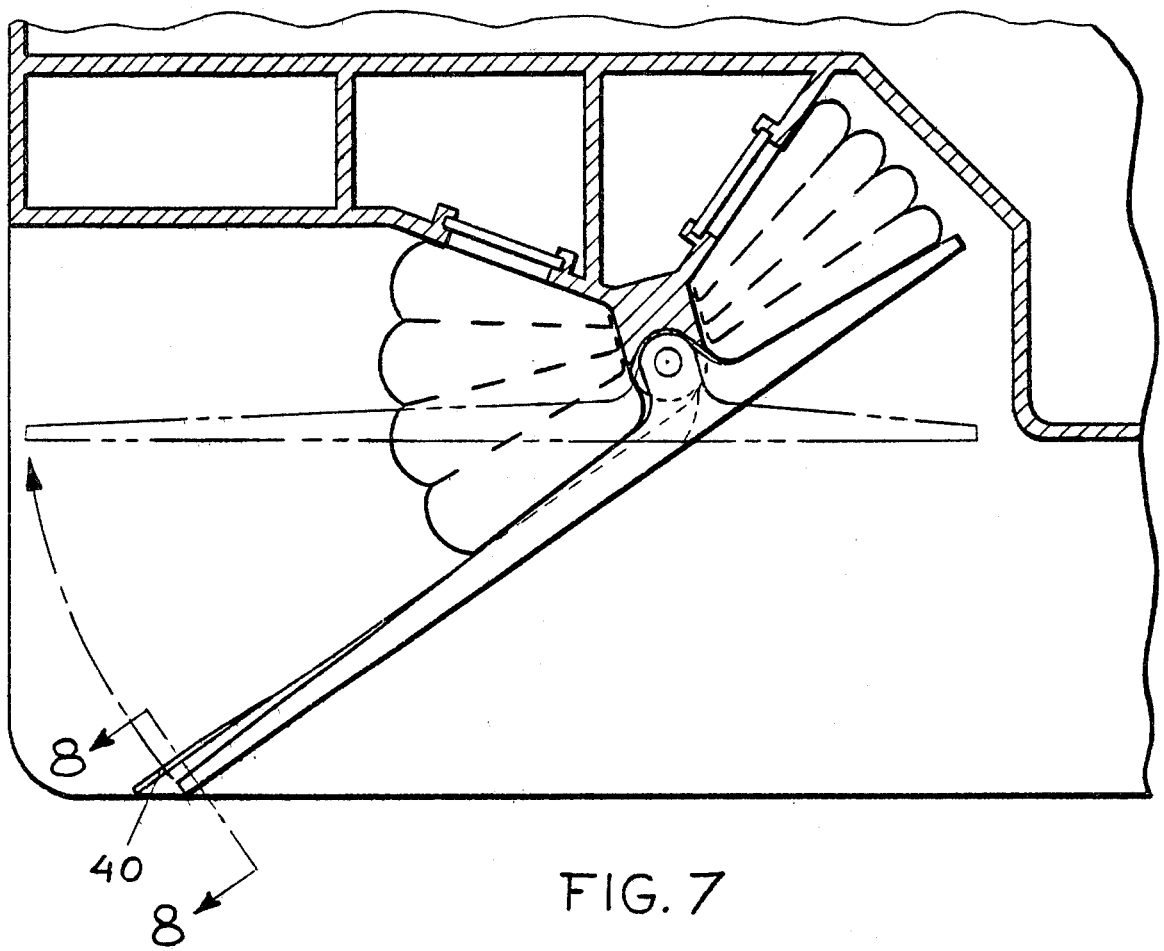
FIG. 7 is a section through the stern seal area of the air cushion vehicle as in FIG. 1, but enlarged and showing more detail.

FIG. 7 show enlarged the stern seal. Its design is the same as that of the bow seal except that the cushion pressure will bulge the membranes out in the other direction. This means that at the hemline the membranes continue past the end of the stiffening rods, which requires that auxiliary rods or "stays" 40 are attached to the membranes between the regular rods, to prevent the membranes from folding up. These auxiliary stays could be spring steel, fiberglass or another material bonded or sewn between the membranes proper and doubler membranes 41 as shown in FIG. 8. Other means, like inflated air bags could also be used to stiffen up the lower end of the membranes. Small high frequency waves will not be able to push away the membrane like on the bow seal, but as the stern seal is usually higher off the water surface than the bow seal with a substantial airflow going underneath it, this will not lead to high hydrodynamic drag.

It must be remarked that even though the bow seal and stern seal in the figures are shown with upper and lower air bags that are approximately the same size, this is not necessary. So could for instance on the bow seal the upper air bag which has to balance the cushion pressure in addition to the lower bag, be larger than the lower bag, while on the stern seal the lower bag could be bigger than the upper bag for the same reason.

Another point that has to be made is that even though the seals would work with one set of air bags, it is desirable that at least two sets, preferably four or more sets are provided across the ship. This way the seals can give a roll stability contribution to the ship and failure of a single bag will not completely disable the air cushion vehicle.

Figure 9:
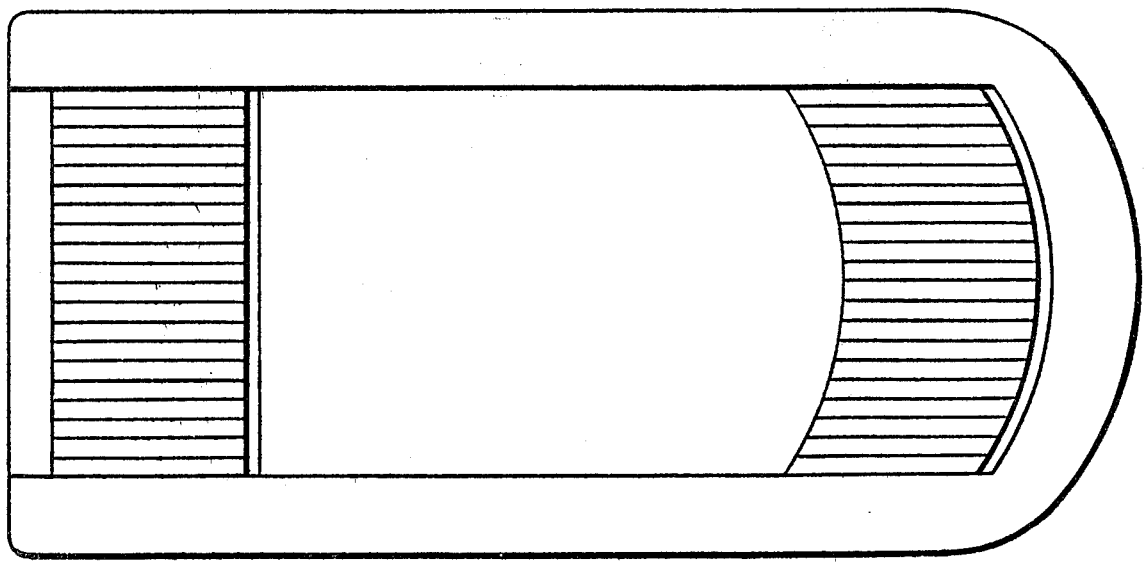
FIG. 9 is a bottom view of an air cushion vehicle like the one shown in FIG. 3, but with a curved instead of a straight across bow seal.

FIG. 9 shows the bottom view of an air cushion vehicle with bag-positioned hinged seals as discussed, except that the bow seal has been given a curved shape by offsetting the hinge points of the individual stiffening rods. The advantage of such a curved bow seal is that when the vehicle is travelling in a direction perpendicular to the wave crests, the waves will not impact onto the whole seal surface in the same instant, which will make the ride smoother. However, the pilot of the ship can also prevent these impacts on a straight across boe seal by steering his vehicle slightly off the direction perpendicular to the wave crests.

Figure 10:
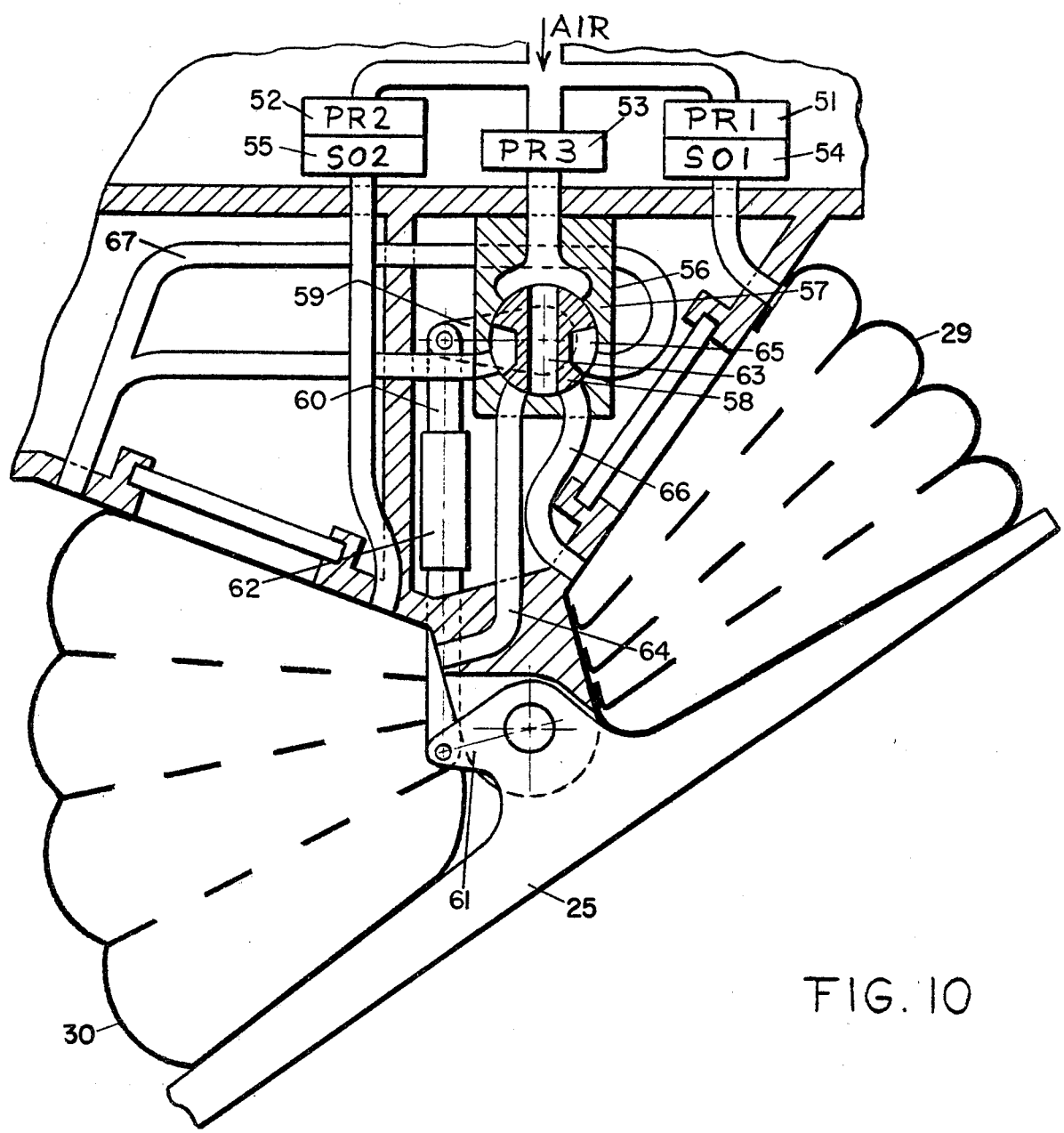
FIG. 10 is a section through the bag and back-up chamber area of either a bow seal or a stern seal as shown in FIG. 4 and FIG. 7, but enlarged and showing the control system that keeps the seal in its nominal position.

FIG. 10 shows enlarged the bag and back-up chamber section of either a bow seal or a stern seal, with the control system that keeps the seal in its nominal position. The control system consists of three pressure reducing valves 51, 52 and 53, shown schematically as rectangular boxes with symbols PR1, PR2 and PR3 in them, to facilitate explanation of the system, two shut-off valves 54 and 55, shown again schematically as rectangular boxes with symbols SO1 and SO2 in them, and a master control valve 56.

For a bow seal to stay in its position at a given cushion pressure, the pressure in the lower bag 30 has to be at least a small amount over the cushion pressure to keep the bag properly inflated, and the pressure level in the upper bag 29 has to be such that it balances the stiffening rods against the cushion pressure forces on membranes and rods and the forces from the lower bag on the rods. In a stern seal this is reversed, the pressure in the upper bag has to be at least a small amount over cushion pressure and the pressure in the lower bag has to be such that it balances the cushion pressure forces and the forces from the upper bag. As there is always some leakage through the seams of the air bags, a continuous supply of air to the bags is needed. This is accomplished with the two pressure-reducing valves PR1 and PR2, which are supplied with compressed air from the top in FIG. 10 as indicated with an arrow marked "AIR". These pressure-reducing valves are remotely adjustable by the pilot of the ship, so that he can correct the air bag pressures if the cushion pressure of the vehicle changes, for instance due to a change in loading of the ship. It is possible to incorporate a device into the system that senses the cushion pressure and automatically adjusts the pressure-reducing valves accordingly.

The action of the pressure-reducing valves PR1 and PR2 in itself will not be sufficient to keep the seal in a certain position, because the equilibrium between cushion pressure forces and air bag forces will not be stable. Any deviation of cushion pressure or air bag pressure from the theoretical value and large enough to overcome the friction in the hinge joints, will start a continuous rotation of the seal around its hinge axis. Therefore the master control valve 56 is added. It consists of a valve body 57 with a rotary core 58, shown in the neutral position with all the ports blocked in FIG. 10. The rotary valve core has a feedback link to the seal position. In FIG. 10 this feedback link is shown as a mechanical link consisting of a lever 59 attached to the valve core, connected by a link 60 to a lever 61 attached to one or more of the stiffening rods 25 (in the latter case through an averaging device).

Link 60 can be changed in length by a servomechanism 62 (motor driven screw, hydraulic cylinder or the like) that allows the pilot of the ship to remotely change its length and thereby the nominal position of the seal. It has sufficient adjustment to allow the pilot to set the seal at any position between fully down with the lower hemline of the seal approximately flush with the bottom of the sidewalls, and fully up with the seals approximately horizontal as shown in phantom in FIGS. 4 and 7.

The master control valve receives air through the pressure-reducing valve PR3, which is set at a substantially higher pressure than PR1 and PR2.

The functioning of the master control valve is as follows: When the seal is pushed up from its nominal position by for instance a wave, the feedback link 60 will rotate the valve core connecting the pressurised center passage 63 in the valve core with a duct 64 to the bag that is compressed, thus creating a restoring force that will push the seal back to its nominal position.

When the seal is pushed up a substantial amount, the valve core will also connect the air bag that is expanding, to the cushion by way of core passage 65 and ducts 66 and 67, thus letting air out of it, while at the same time shutting off the air supply to the bag through PR1 with shut-off valve SO1 (the system to actuate the shut-off valves is omitted for clarity reasons—systems to do this are existing state-of-the-art). When the seal is disturbed downwards, the functioning of the master control valve will be the same except that the valve core will rotate in the other direction, and other passages and ducts will be used as can be easily seen in FIG. 10.

Instead of the type of rotary master control valve shown, other types, like sliding valves can be used. Also, it is possible to have instead of one central valve a number of independent valves in the ducts that are guided by a central control system (electronic, fluidic and other types of control systems are existing state-of-the-art).

The just described control system can be a slow response system, only designed to keep the seal in its nominal position and not intended to respond to wave action. The control system will act if the seal is disturbed by waves, but its action will be too slow to have any significant influence. The advantage of such a control system is its low air consumption. The response characteristics of a seal with this type of control system will depend on the mass of the seal, the spring characteristics of the air bags and the damping of the system. As this membrane and stiffener rod seal has a relatively low inertia, the springs do not have to be very stiff to move the seal fast enough downwards after passing a wave to prevent large air losses, which means that the hydrodynamic drag when the seal is pushed up by a wave will be moderate. In addition the pilot can change, depending on sea state, speed and heading of the ship, the spring characteristics of the air bags and the damping in the system by more or less opening or closing of the valves between the air bags and the back-up chambers in the ship structure. The spring characteristics of the air bags can also be changed, that is made stiffer, by increasing the pressure level in the air bags over that required to have the lowest pressure air bag pressurised to just above cushion pressure.

However in heavy seas air losses will be high or the hydrodynamic drag will be high, while the pitch, heave and roll motions of the ship will become uncomfortable. If the air cushion vehicle will be operated in an environment where heavy seas are a frequent occurence, it should therefore be considered to size the control system such that it can respond to wave action. This means large valves, wide ducts and a high-volume air supply. In addition wave height sensors will be needed and a computorised control system that pushes the seal up when following waves upwards to reduce hydrodynamic drag and pushes the seal down when following waves downwards to reduce air leakage.

To improve ride quality, acceleration sensors and gyroscopes can be added and the movements of the seals can be controlled to reduce objectionable movements. Lifting up a seal will reduce the cushion pressure in that end of the cushion and reduce upward acceleration. Pushing down a seal will increase cushion pressure and generate upward planing forces, reducing downward acceleration.

To be able to control roll stability it is desirable—as was mentioned before—to have at least two, but preferably four or more sets of air bags across the ship. In addition the upper air bags as well as the lower air bags can be connected to each other with controllable valves. It also is desirable that each set of cooperating upper and lower air bags has its own master control valve so that the sections of the seal can be steered independent of each other.

While the invention has been described and illustrated herein with reference to the preferred embodiment thereof, it will be understood by those skilled in the art that various changes in form and details may be made therein, without departing from the spirit and scope of the invention.

What is claimed is:

1. In a water-traversable vehicle of the type having a hull with depending sidewalls and flexible bow and stern seals to confine a vehiclesupporting fluid cushion, at least one of said flexible seals comprising a flexible seal member positioned between said sidewalls in lateral contacting relation therewith and having upper and lower end portions, fulcrum means mounted by the hull and connected to the seal member intermediate said upper and lower end portions for accommodating pivotal displacement of the seal member about a fulcrum axis in response to cushion pressure exerted thereon, and inflatable positioning support means having separate portions engageable with the seal member adjacent the upper and lower end portions respectively on opposite sides of the fulcrum axis for balancing said cushion pressure applied and wherein said flexible seal member includes a plurality of laterally spaced stiffening rods to which the fulcrum means is connected, and flexible membrane panels supported between said stiffening rods.

2. A seal for vehicles travelling over a surface, supported above that surface, at least in part, by a cushion of pressurized fluid, said seal sealing off this cushion at least at one of its ends, other means sealing off the other sides of this cushion, said seal consisting of the following combination of elements:

(a) a plurality of stays across the width of the vehicle, said stays being placed substantially parallel to each other and substantially equidistant from each other, and having under operating conditions a slanted position with the lower end rearward of the upper end, said stays being attached to the frame of the vehicle with hinges, said hinges being located in the proximity of the upper boundary of the fluid cushion, and said stays extending a substantial distance below said hinges to the proximity of the lower boundary of the fluid cushion, and said stays also extending a substantial distance above said hinges;

(b) a plurality of membranes between and attached to said stays, said membranes being made out of material that is flexible, said membranes having a substantial amount of slack in them so that a particular stay can hinge a substantial amount relative to its neighboring stays without the membranes between them getting tight; and (c) two bag means filled with pressurized fluid, one located above the hinges of the stays and one located below the hinges of the stays, thus opposing each others action, said bag means consisting of at least one loop of flexible material, the lower loop surface of said bag means resting on the stays and the upper loop surface of said bag means resting against the vehicle structure, the pressure of the fluid in said bag means being maintained by pressure controlling means such that the forces on the seal from said fluid bag means maintain the seal in a preset nominal position, and create a resultant force forcing the seal back into its nominal position when the seal is disturbed away from its nominal position.

3. A seal as described in claim 2, wherein each bag means includes a plurality of bags, one plurality of bags acting on the extensions of the stays above the hinge points, and the other plurality of bags acting on the sections of the stays below the hinge points.

* * * * *